Figure 1:
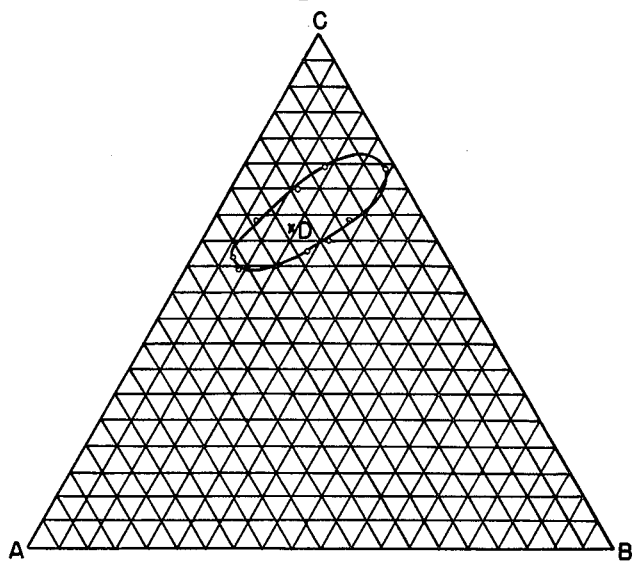

Jan. 4, 1966    R. W. BRAGDON ETAL    3,227,748
PURIFICATION OF QUATERNARY AMMONIUM COMPOUNDS
Filed Feb. 25, 1963

Inventors:
Robert W. Bragdon,
Edward A. Sullivan,
by J. Hugh Bou
Attorney

3,227,748
PURIFICATION OF QUATERNARY AMMONIUM COMPOUNDS

Robert W. Bragdon, Marblehead, and Edward A. Sullivan, Beverly, Mass., assignors to Metal Hydrides Incorporated, Beverly, Mass., a corporation of Massachusetts
Filed Feb. 25, 1963, Ser. No. 260,721
8 Claims. (Cl. 260—501)

This invention relates to metathetical reactions of quaternary ammonium compounds with sodium and potassium compounds, and more particularly to a novel process for effecting such reactions in aqueous solution and to a method for the purification of quaternary ammonium compounds. It is based on the discovery that water solutions of quaternary ammonium compounds which contain 5 to 15 carbon atoms and sodium and potassium compounds selected from the group sodium hydroxide, potassium hydroxide, sodium sulfate, potassium sulfate, potassium carbonate, sodium carbonate, potassium fluoride, potassium tartrate and potassium citrate display the remarkable property of splitting into two liquid layers under certain conditions of concentration. Use is made of this phase separation to provide a driving force for the metathetical reactions and to facilitate the separation of the products from the reaction mixture in pure form. For convenience, we refer to the above specifically mentioned sodium and potassium compounds as "splitting agents."

The reactions contemplated by the present invention can be represented by the following chemical reaction equation:

$$MA + QB \xrightarrow{H_2O} QA + MB$$

where
M = Na or K
A = An anion which is compatible with water and forms very soluble quaternary ammonium compounds
Q = A quaternary ammonium cation containing 5–15 carbon atoms
B = Hydroxide, carbonate or sulfate A has a stronger affinity for Q than does B.

In addition, the invention also covers reactions where MB = KF, K tartrate, and K citrate.

Also, when MB does not constitute a member of the group NaOH, KOH, $Na_2CO_3$, $K_2CO_3$, $Na_2SO_4$, $K_2SO_4$, KF, K tartrate, or K citrate, the invention may be practiced by adding one of this group to the system providing that the anion B is farther to the left in the affinity series than the anion of the compound chosen from said group.

The metathetical process may be more specifically illustrated by the reaction of tetraethylammonium hydroxide with sodium borohydride according to the equation $$(C_2H_5)_4NOH + NaBH_4 \xrightarrow{H_2O} (C_2H_5)_4NBH_4 + NaOH$$

When sodium borohydride is dissolved in a 40% solution of tetraethylammonium hydroxide in water, the reaction mixture splits into two liquid phases. The upper layer is a pure, concentrated solution of tetraethylammonium borohydride, and the lower layer is an aqueous caustic solution.

Example 1

Forty pounds of 98.5% pure sodium borohydride (1.04 lb.-mole) were added to 366 pounds of 40.25% aqueous tetraethylammonium hydroxide (1.00 lb.-mole) in pilot plant equipment. The mixture was stirred and allowed to settle, whereby two immiscible layers were formed at room temperature. The top layer was decanted and dried in a vacuum oven at 80° C. A total of 141.5 lbs. of 99.0% pure tetraethylammonium borohydride were recovered, representing a 97.5% yield.

While the phase separation is a necessary part of the metathetical reactions carried out according to the present invention, there is another factor which is important in determining which reactions will proceed satisfactorily. This factor is related to the affinity of the quaternary ammonium cation for the various anions involved in the reaction. For example, in the above illustrated equation, the reaction proceeds to nearly quantitative completion because the relative affinity of the tetraethylammonium cation for the borohydride anion is considerably greater than its affinity for the hydroxide anion.

To better delineate this factor, a series of relative affinities of a variety of anions for quaternary ammonium cations was determined. The following series was established:

$$BH_4^- > Br^- > Cl^- > F^- > OH^- > CO_3^= > BO_2^-$$

Reference to this series of relative affinities will facilitate the determination of the ease with which a metathesis can proceed. In general, it can be said that in any reaction mixture, the quaternary ammonium compound of that anion which is farthest to the left in this series will predominate. If a given anion is much farther to the left than another anion in the reaction mixture, then the reaction will be essentially quantitative. This is the case when we react tetraethylammonium hydroxide and sodium borohydride.

When the two anions are close together, as is the case with borohydride and bromide, it becomes necessary to employ countercurrent contact of the reactants to drive the reaction to completion.

Example 2

A batch countercurrent reaction of tetraethylammonium bromide and sodium borohydride was carried out in the following manner: A feed solution containing 37.5% tetraethylammonium bromide in water was contacted in a five-stage batch countercurrent manner with a stabilized water solution of sodium borohydride which contained 11.8% sodium borohydride and 38.5% sodium hydroxide. 212.2 grams of the quaternary ammonium bromide solution and 128.4 grams of the sodium borohydride solution were used in each stage. The apparatus consisted of five glass separatory funnels used as mixers and settlers. After sufficient cycles had been carried out to ensure equilibrium, the upper layer which had contacted five successive lower layers in a countercurrent manner was isolated and found to contain tetraethylammonium borohydride in good yield and purity. The lower layer which had contacted five successive upper layers in a countercurrent manner was also isolated and found to consist essentially of an aqueous caustic solution in which the by-product sodium bromide was dissolved.

It should be pointed out, also, that it is possible to carry out reactions in which the anion of a quaternary ammonium compound can be exchanged for another anion which is found to the right of it in the above series, even though the equilibrium is unfavorable, by use of the countercurrent contact.

Example 3

A 40% solution of $Et_4NOH$ in water was mixed with a concentrated NaBr solution in equimolar amount. The reaction mixture separated into two liquid layers. The top layer consisted of a concentrated solution of $Et_4NBr$. The reaction yield was 89.4%.

Example 4

A concentrated solution of $Et_4NBr$ (1.0 mole) in water was placed in a separatory funnel. An equimolar amount of 25% NaOH solution was added and well mixed. Two layers formed. The lower layer was drawn off and discarded. The upper layer was contacted four additional times with fresh caustic solution. At the end of this five-stage reaction, the quaternary bromide had been converted to $Et_4NOH$ in 18.5% yield.

In order for the remarkable phase separation characteristic of this invention to occur, it is necessary that the quaternary ammonium compound be selected from the group containing from 5 to 15 carbon atoms attached to the nitrogen, and it is also necessary for a sodium or potassium compound, selected from the group consisting of sodium hydroxide, potassium hydroxide, sodium sulfate, potassium sulfate, sodium carbonate, potassium carbonate, potassium fluoride, potassium tartrate and potassium citrate, to be present. Frequently, the sodium or potassium compound will be formed by the metathetical reaction being carried out. This is the case in the following reactions, for example:

$$Pr_4NOH + NaBH_4 \rightarrow Pr_4NBH_4 + NaOH$$

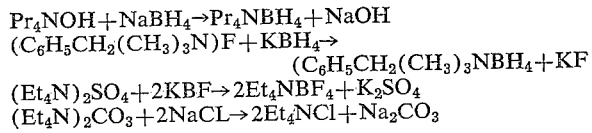

$$(Et_4N)_2SO_4 + 2KBF \rightarrow 2Et_4NBF_4 + K_2SO_4$$
$$(Et_4N)_2CO_3 + 2NaCL \rightarrow 2Et_4NCl + Na_2CO_3$$

The present invention is not limited, however, to reactions in which a sodium or potassium compound from this group are formed as a by-product. However, when the metathetical reaction desired does not form a sodium or potassium compound which is a splitting agent, it is necessary to add a member of this group to the reaction mixture. For example, the reaction of tetraethyl-ammonium bromide with sodium borohydride in water does not result in the necessary phase separation. It is necessary, therefore, to add a splitting agent such as sodium hydroxide to the system. When this is done, phase separation occurs and the reaction can proceed. In this particular reaction, however, the borohydride and bromide anions are close together in the affinity series, so the reaction does not proceed to completion simply because of the desired phase separation. It is necessary, also, to carry out the reaction using countercurrent contact. This is readily done by forming one solution consisting of a (concentrated) solution of tetraethylammonium bromide in water and forming a second solution consisting of a concentrated solution of sodium hydroxide and sodium borohydride in water. These two solutions are then passed countercurrent to one another to obtain a quantitative reaction. See Example 2.

Countercurrent contact can be either the batch or continuous type. Batch countercurrent contact can be carried out in a series of separatory funnels by methods known to those skilled in the art. Continuous countercurrent contact can be carried out in equipment such as a York-Scheibel column. When a York-Scheibel column is used, the lighter quaternary ammonium reactant solution is fed continuously near the bottom of the column and the heavier sodium borohydride-caustic solution is fed near the top of the column. The two reactant solutions pass countercurrent to each other, and a substantially pure concentrated solution of tetraethylammonium borohydride is continuously drawn off the top of the column and a solution of sodium hydroxide-sodium bromide in water is drawn continuously off the bottom of the column.

*Example 5*

The operations of Example 2 were repeated using a liquid-liquid laboratory York-Scheibel extraction column to carry out the countercurrent reaction. The aqueous tetraethylammonium bromide solution was fed into the bottom of the column and the stabilized water solution of sodium borohydride was fed near the top of the column. Mixing and settling of the counterflowing liquid phases was effected by alternate stirring and settling as carried out in a York-Scheibel type extractor. A light phase was taken off the top of the column and found to consist of a concentrated aqueous solution of tetraethylammonium borohydride in good yield and purity. A heavy phase was taken off the bottom of the column and found to consist of an aqueous solution of sodium hydroxide and sodium bromide with a very small amount of unreacted sodium borohydride.

In the practice of the invention, it may be found necessary to use countercurrent contact in metathetical reactions in which a splitting agent is formed as a by-product of the reaction. This would be the case when the anions involved in the reaction are close together in the affinity series, or when the anion of the quaternary ammonium salt to be formed is found to the right of the anion of the quaternary ammonium salt used as a reactant. In this case, it will be found expedient to dissolve the sodium or potassium salt to be formed as a by-product together with the sodium or potassium salt to be used as one of the reactants. In this way it is not necessary for the reaction by-product to first be formed before a layer split can be had.

*Example 6*

To illustrate this latter point, a continuous countercurrent reaction of tetraethylammonium hydroxide and sodium borohydride was carried out in the following way. A tetraethylammonium hydroxide solution was fed continuously near the bottom of a column. A sodium borohydride-sodium hydroxide water system was fed near the top of the column. The two solutions were caused to pass countercurrent to each other and the reaction products removed from the top and bottom of the column. The light layer was a concentrated solution of $Et_4NBH_4$ in a very high state of purity.

At first glance, the operation of this particular reaction in a countercurrent manner might seem unnecessary since the reaction proceeds in one stage to 97.5% yield anyway. However, for certain uses, the quaternary ammonium borohydrides must be in a very high state of purity; therefore, it may be occasionally desirable to carry out the reaction in a countercurrent manner in order to increase an already very high yield and purity.

It should be pointed out that there is a device available which permits the preparation of a quaternary ammonium salt containing 5 to 15 carbon atoms in combination with any anion in the affinity series from any other quaternary ammoium salt. It has already been pointed out that in exchanging anions, it is easier to replace an anion attached to a quaternary ammonium cation if that anion is far to the right in the affinity series. It is obvious, therefore, that borohydride salts of the quaternary ammonium compounds are the easiest to prepare, and the quaternary ammonium salts of the metaborate anion are the most difficult to prepare by this invention. However, if one takes a quaternary ammonium borohydride and causes it to react with water, either by raising the temperature or introducing a catalyst such as nickel or cobalt boride, the borohydride hydrolyzes to form borate. Consequently, if one starts with tetraethylammonium bromide and wishes to prepare tetraethylammonium carbonate, one way in which this can be accomplished is as follows:

*Example 7*

$Et_4NBr$ was first converted to $Et_4NBH_4$ as described in Example 2. The resulting aqueous solution of $Et_4NBH_4$ was then hydrolyzed by adding a small quantity of $Ni_2B$.

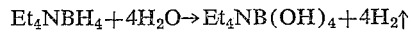

The $Ni_2B$ catalyst was then removed by filtration and the $Et_4NB(OH)_4$ solution mixed with an equimolar quantity of an aqueous solution of sodium carbonate. The mixture separated into two layers and the upper layer was decanted and found by analysis to be a concentrated aqueous solution of $(Et_4N)_2CO_3$.

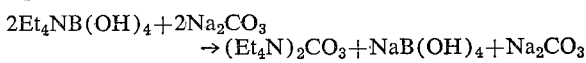

One can also prepare Et$_4$NB(OH)$_4$, and in a cheaper way, by the reaction of boric acid and Et$_4$NOH $$Et_4NOH + H_3BO_3 \xrightarrow{H_2O} Et_4NB(OH)_4$$

It will be apparent from the foregoing that the scope of the present invention encompasses technology markedly similar to ion exchange technology. In ion exchange technology it is common to use ion exchange resins. These resins sometimes take the form of strongly basic quaternary ammonium resins which are capable of capturing ions out of aqueous solution. In practice, the quaternary ammonium ion exchange resins can function somewhat as follows. The ion exchange resin is loaded into a vertical glass reaction column. The resin is put on a hydroxide cycle by passing a dilute caustic solution through the column until all of the resin has been converted to the hydroxide form. It is then washed out with water. Following this preparation, a solution of an alkali metal salt, such as lithium chloride, is run slowly through the column. As the salt solution passes down the column, it reacts progressively with the ion exchange resin and is converted to lithium hydroxide. Concurrently, the ion exchange resin is converted to the chloride form. In effect, then, sodium hydroxide has reacted with lithium chloride to form lithium hydroxide and sodium chloride. A wide variety of chemical reactions can be carried out using an ion exchange resin as an intermediate stage.

Likewise, a number of liquid ion exchangers have been developed. For example, solutions of long-chain quaternary ammonium chlorides in organic solvents which are immiscible with water have been used for this purpose. Such an organic solution can be brought into contact with an aqueous solution of a salt, and, by the use of countercurrent techniques, exchange with the anions can be brought about.

The present invention, however, is the first known example of the use of a liquid ion exchanger which can operate in aqueous solution as a two-phase system without the use of organic solvents or insoluble resin phases. There are a number of advantages to the new system which will be made evident. First of all, a distinct advantage is enjoyed over the technology where resinous compounds are used. The resins have proved to be expensive and difficult to prepare, and, consequently, their large-scale industrial use has been limited to the treatment of very dilute solutions containing relatively small quantities of anionic compounds. Second, these materials have a high equivalent weight; i.e., a very large weight and volume of the ion exchange resin is required to effect a chemical reaction. This means that considerable quantities of the ion exchange resins must be kept on inventory and large and expensive equipment must be used. Third, the ion exchange resins are dependent to a large degree on their physical form for their effective properties. It is important to note that these resins are not so stable that they may be recycled and re-used indefinitely. When they have lost their physical form and porosity, they must be discarded and replaced. On the other hand, the liquid ion exchangers suffer from the need for handling of large quantities of expensive and inflammable and explosive organic solvents. Furthermore, these ion exchangers, too, suffer from large equivalent weights and, consequently, large amounts of these chemicals must be employed to effect a rather small amount of ion exchange.

The materials of the present invention, however, are inexpensive, have a low equivalent weight, do not depend upon thier physical form for their activity, do not require the use of organic solvents, and are easily recycled for re-use. In addition to this, the aqueous solutions of the quaternary ammonium salts form highly concentrated solutions in water. Consequently, the equipment needed for carrying out ion exchange with these new materials is relatively compact and inexpensive. Actually, the processes are similar in detail with those used in liquid-liquid extraction. Equipment for such operations is already highly developed and can be purchased at low cost and from a variety of sources. Reactions can be carried out efficiently either on a batch countercurrent or continuous countercurrent basis. Recycle of the reactants offers no problems.

Methods by which these new materials can be used as liquid ion exchangers in water solution are illustrated by the following reactions.

1. *Preparation of KBr from K$_2$CO$_3$.*—Et$_4$NBr is used as the liquid ion exchanger. If the quaternary salt is purchased in the hydroxide form, it is first converted to the bromide by contact with NaBr dissolved in aqueous caustic.

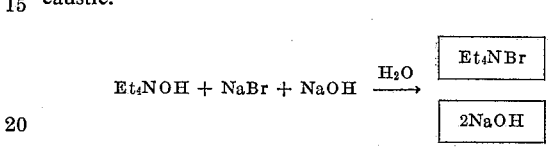

To convert K$_2$CO$_3$ to KBr, an aqueous solution of K$_2$CO$_3$ is contacted with the liquid ion exchanger. An excess of K$_2$CO$_3$ is necessary since it is required as a splitting agent.

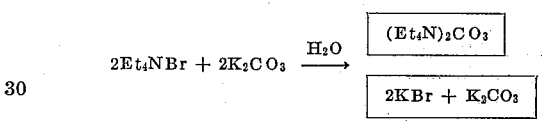

The product KBr can be recovered from the K$_2$CO$_3$ splitting agent by conventional techniques such as fractional crystallization. The liquid ion exchanger is recovered as the top layer in the carbonate form. It can be regenerated to the bromide form by contacting with an aqueous NaBr solution

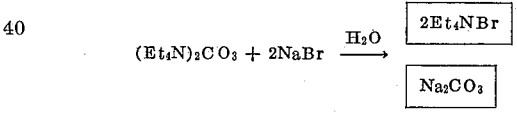

Here the by-product Na$_2$CO$_3$ acts as the splitting agent. The over-all reaction is $$K_2CO_3 + 2NaBr \rightarrow 2KBr + Na_2CO_3$$

2. *Recovery of uranium.*—Et$_4$NOH is used as the liquid ion exchanger. The object is to recover uranium in purified form from a caustic solution of uranium and other ore constituents such as, for example, boron in the form of metaborate. The caustic solution is contacted in a continuous countercurrent manner with the liquid ion exchanger. Uranium is selectively extracted into the upper layer according to the reaction

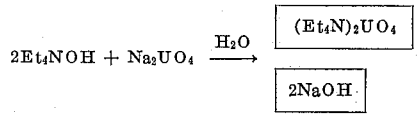

The purified uranium can then be recovered as a caustic solution of Na$_2$UO$_4$ by countercurrent contact with pure caustic.

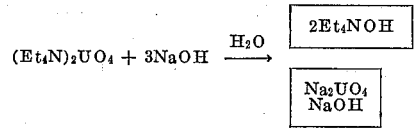

3. *Conversion of Na citrate to K citrate.*—Et$_4$NBr in water is used as the liquid ion exchanger. An aqueous solution of Na citrate is contacted with the ion exchanger.

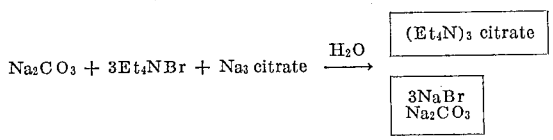

$$Na_2CO_3 + 3Et_4NBr + Na_3\text{ citrate} \xrightarrow{H_2O} \begin{array}{|c|} \hline (Et_4N)_3 \text{ citrate} \\ \hline 3NaBr \\ Na_2CO_3 \\ \hline \end{array}$$

$Na_2CO_3$ is used as the splitting agent. The upper product layer is then contacted with an aqueous solution of KBr.

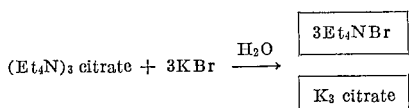

$$(Et_4N)_3\text{ citrate} + 3KBr \xrightarrow{H_2O} \begin{array}{|c|} \hline 3Et_4NBr \\ \hline K_3 \text{ citrate} \\ \hline \end{array}$$

The $K_3$ citrate product is recovered from the heavy bottom layer.

It is a peculiarity of the present invention that most boron compounds, such as those selected from the group consisting of $R_4NBH_4$, $R_4NB_3H_8$, $R_4NBr'_4$, $R_4NBF_4$ are very easily prepared. It is an anomaly that the quaternary ammonium metaborates are among the most difficult to prepare. With the exception of the quaternary ammonium metaborates, however, the method of the present invention is particularly suited to the preparation of quaternary ammonium boron compounds. The following examples illustrate this point.

*Example 8*

A concentrated solution of tetraethylammonium hydroxide in water was mixed with a water solution of sodium boron tetraethyl. The quantities of tetraethylammonium hydroxide and sodium boron tetraethyl were in substantially stoichiometric ratio according to the equation

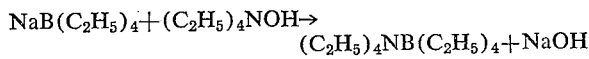

$$NaB(C_2H_5)_4 + (C_2H_5)_4NOH \rightarrow (C_2H_5)_4NB(C_2H_5)_4 + NaOH$$

The resulting liquor was allowed to settle and separated into two liquid layers. The upper layer consisted of a substantially pure aqueous solution of tetraethylammonium boron tetraethyl, while the lower layer was an essentially pure sodium hydroxide solution. Additional tests revealed that the yield and purity could be improved still further by contacting the resulting solutions in a continuous countercurrent manner.

*Example 9*

The above experiment was repeated, but using a water solution of $NaB_3H_8$ in place of the water solution of $NaBEt_4$. In this case, quaternary ammonium triborohydride was obtained in good yield and purity as a water solution.

*Example 10*

An aqueous solution of sodium fluorborate was mixed with an aqueous solution of tetrapropylammonium hydroxide. Two liquid layers formed. The lighter layer was separated and analyzed. It was found to consist essentially of a concentrated aqueous solution of tetrapropylammonium fluoborate.

The manner in which the phase separation contributes to the forcing of metathetical reactions and to the separation of products in pure form has been made evident. The singular utility of the present invention for purification will now be described.

The method of the invention is especially suited to the purification of quaternary ammonium compounds which contain 5-carbon atoms attached to the nitrogen by the separation of impurities selected from the group NaOH, KOH, $Na_2SO_4$, $K_2SO_4$, $Na_2CO_3$, $K_2CO_3$, K citrate, K tartrate, and KF. When a concentrated aqueous solution of the quaternary compound is prepared, the impurity separates as a separate liquid phase and the purified quaternary compound can be separated by decantation.

*Example 11*

100 g. of 60% $Et_4NHB_4$–40% NaOH was dissolved in a minimum quantity of water. The solution was permitted to settle and two layers formed. The upper layer was decanted and dried in a vacuum oven. 58 g. of 99.0% pure $Et_4NBH_4$ was recovered.

*Example 12*

100 g. of 50% $(Et_4N)_2SO_4$–50% $Na_2SO_4$ was dissolved in a minimum quantity of water. Two layers formed. The upper layer contained 95% pure $(Et_4N)_2SO_4$.

*Example 13*

100 g. of 65% benzyltrimethylammonium chloride–35% $Na_2SO_4$ was dissolved in a minimum quantity of water. Two layers formed. The upper layer contained 90% benzyltrimethylammonium chloride.

The method of the invention may also be used to separate impurities which are not splitting agents, provided that one of the splitting agents is used as the purification agent. To do this, a concentrated aqueous solution of a compound selected from the group NaOH, KOH, $Na_2SO_4$, $Na_2CO_3$, $K_2CO_3$, KF, K tartrate, and K citrate is contacted with a concentrated aqueous solution of the impure quaternary ammonium compound. The impurity extracts into the lower layer leaving a highly purified upper layer.

*Example 14*

100 g. of 60% $Et_4NCl$–40% $NaBO_2$ was dissolved in a minimum amount of water and contacted with 300 g. of a 30% NaOH solution. The $NaBO_2$ passed into the heavy lower layer. The upper layer was dried in a vacuum oven and 90% pure $Et_4NCl$ recovered.

By the proper use of the methods of the present invention it is possible to purify a variety of Na or K salts using quaternary ammonium compounds with 5–15 carbon atoms as the purification agent.

Compounds selected from the group of splitting agents can be freed of impurities by contact with a quaternary ammonium compound solution in water.

*Example 15*

A 25% sodium hydroxide solution in water containing 2% sodium chloride was shaken successively with five equal weight ports of a 40% solution of tetraethylammonium hydroxide in water. After the fifth such stage, the heavy aqueous caustic layer was analyzed and found to be essentially freed of its chloride contaminant.

*Example 16*

The present industrial method for the preparation of sodium borohydride is accompanied by the production of 50% aqueous caustic as a by-product. This by-product contains 0.2 to 1% sodium borohydride as an impurity. A sample of this material that contained 0.5% $NaBH_4$ was diluted 1:1 with water. The dilute solution was then contacted with five successive equal weight portions of 40% tetraethylammonium hydroxide. Following this treatment, the aqueous caustic was found by analysis to contain less than .02% $NaBH_4$.

The present invention can be used to separate one anion from another which is markedly different in its position in the affinity series. This can be done essentially by the method exemplified in Examples 15 and 16.

A special benefit of the present invention derives from the use of recrystallization methods in conjunction with the methods of the invention. Normally when one purifies a salt by recrystallization, one must contend with the problem of build-up of impurities in the mother liquor. When a mother liquid becomes too impure, it can no longer be used because it contaminates the crystals being purified. Frequently one can prevent the build-up of impurities by drawing off a portion of the liquor and recycling it to an earlier point in the process. Often this is inconvenient, overloads the equipment, is too expensive, or fails to work.

The special advantage of the present invention will be evident by a consideration of the purification of $Et_4NBH_4$ by recrystallization from water. The solubility of $Et_4NBH_4$ in water is 292 g. per 100 g. of water at 60° C. and 197 g. per 100 g. of water at 25° C. It is a simple matter, therefore, to recrystallize $Et_4NBH_4$ by forming a saturated solution at 60° C. and cooling to 25° C. Recrystallization can also be effected by the evaporation of a saturated solution. When impure $Et_4NBH_4$ containing NaOH is made into a saturated solution, any NaOH in excess of about 1% will form a separate layer and can be drawn off. If the saturated solution is then evaporated, $Et_4NBH_4$ will crystallize out. But this will leave the liquor with more NaOH than it can hold. Consequently, an aqueous caustic layer will also separate. The $Et_4NBH_4$ crystals are light and will float to the surface. The aqueous caustic is heavy and will sink to the bottom. The intermediate layer will consist of a saturated $$Et_4NBH_4—H_2O$$

solution. It will be seen that the invention provides a means for continuously purging impurity from the crystallization system.

In fact, the crystallization process could be advantageously carried out in a continuous evaporator. The evaporator could be continuously fed into an impure saturated $Et_4NBH_4$—$H_2O$ solution. Crystals could be continuously withdrawn from the top of the evaporator and caustic could be continuously purged from the bottom.

As previously indicated, the practice of the present invention involves obtaining two immiscible aqueous solutions, the essential component of one being a compound or salt referred to herein as a splitting agent and the essential component of the other being a quaternary ammonium compound the cation of which is selected from the group having a total number of carbon atoms from 5 to 15 inclusive. The combined amount of water in these solutions must not be less than a certain minimum and must not be more than a certin maximum. This is illustrated in the accompanying drawings in which—

Figure 2:
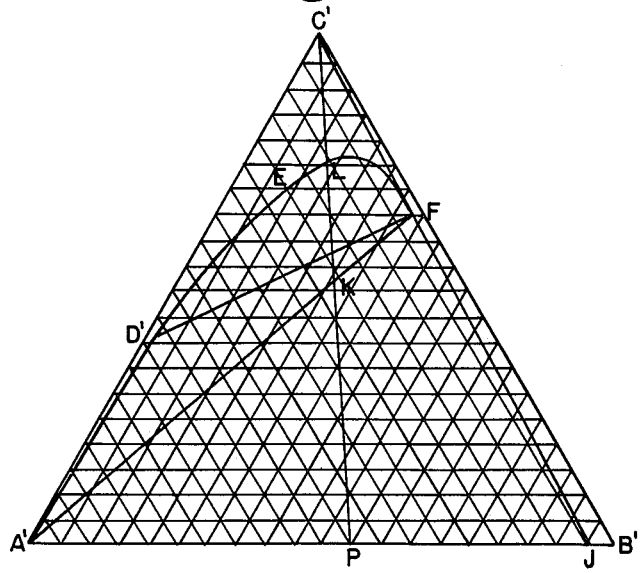

FIG. 1 is a triangular graphical representation of the system water, sodium hydroxide, and an equimolar mixture of tetraethylammonium chloride and sodium borohydride; and FIG. 2 is a triangular graphical representation of the system water, tetraethylammonium borohydride and sodium hydroxide.

In FIG. 1 of the drawing, the vertex A of the triangle represents 100 percent of an equimolar mixture of tetraethylammonium chloride and sodium borohydride. The vertex B represents 100 percent sodium hydroxide and the vertex C represents 100 percent water. The lines parallel to the line AB represent liquor compositions containing different amounts of water in percent by weight from 0 to 100. The lines parallel to the line AC represent liquor compositions containing different amounts of sodium hydroxide in percent by weight from 0 to 100. The lines parallel to the line BC represent liquor compositions containing different amounts in percent by weight from 0 to 100 of an equimolar mixture of sodium borohydride and tetraethyl ammonium chloride or the reaction products thereof. Consequently, any common intersection point within the triangle of lines parallel to the lines AB, AC, and BC represents the amounts in percent by weight of water, sodium hydroxide, and an equimolar mixture of tetraethylammonium chloride and sodium borohydride or the reaction products thereof in a given liquor composition.

The area bounded by the closed loop represents liquor compositions which, when permitted to settle, separate in two immiscible layers. Points within the triangle but outside the closed loop represent liquor compositions which do not form two immiscible liquid layers when permitted to settle. The closed loop was established empirically at room temperature as follows. Water was added to a given mixture of sodium hydroxide, tetraethylammonium chloride and sodium borohydride until just sufficient water was added to form a solution which would settle in two immiscible layers. This established a point on the lower part of the closed loop. Additional water then was added until a liquor was formed which did not settle in two immiscible layers. This established a point on the upper part of the closed loop. This procedure was repeated with different mixtures of water, sodium hydroxide, tetraethylammonium chloride and sodium borohydride until all points on the loop had been determined.

In establishing the closed loop of FIG. 1 empirically, the most significant phase changes, viz. the first appearance of two liquid phases and the reversion to a single liquid phase on further dilution, are readily detected visually by the opalescence exhibited by systems containing two liquid phases, when agitated vigorously. Titration with water of a single known mixture of quaternary ammonium chloride, sodium borohydride, and sodium hydroxide can, then, determine two points of the closed loop such as that shown in FIG. 1, namely, (1) the point of first appearance of two liquid phases, and (2) the point of disappearance of the two liquid phases. From the weights of the known mixture and the quantities of water required to reach these two points, the compositions represented by the two points can be calculated and plotted. Titration of several known mixtures of divergent composition permits rapid outlining of the closed loop.

The diagram in FIG. 1 may be used to establish the compositions of the two immiscible solutions to be used in the practice of the invention. Thus, any point D within the closed loop may be selected. The point D represents a liquor composition which, when permitted to settle, will separate in two immiscible layers. The solution of the tetraethylammonium chloride to be used in countercurrent operation is formed by dissolving an amount of tetraethylammonium chloride represented by the point D in a portion of the amount of water represented by the point D. The solution of sodium borohydride and sodium hydroxide is formed by dissolving in the remaining portion of the amount of water represented by point D the amount of sodium hydroxide represented by the point D together with an amount of sodium borohydride which is the molar equivalent of the amount of tetraethylammonium chloride used.

In a manner similar to that described in connection with FIG. 1, a triangular graphical representation may be established empirically at any desired temperature for any system of water, any water soluble salt of potassium or sodium, any quaternary ammonium salt contemplated by the invention, and any splitting agent. Thus, for example, the vertex A of the triangle may represent 100 percent of an equimolar mixture of tetraethylammonium bromide and sodium citrate and the vertex B of the triangle may represent 100 percent of another splitting agent, such as sodium carbonate, the vertex C representing 100 percent water.

The graphical representation of FIG. 1 depicts the phase relationship under conditions where equimolar quantities of quaternary ammonium compound and sodium or potassium compound are used. For most purposes this is entirely adequate, since the reactions desired necessarily involve equimolar quantities. However, the present invention is not limited to the use of equimolar ratios. There may be instances where it is desirable to use an excess of one or the other of the chemical reactants. When such is the case, it is not convenient to depict the phase relationships on a planar ternary diagram such as FIG. 1. When a non-stoichiometric reaction is to be done in water in the presence of a splitting agent, the phase relationships can be represented by resort to three-dimensional diagrams. A number of methods are suitable. For example, the system can be represented by a solid diagram in the form of a triangular prism. The apexes of one triangular end of the prism represent water, splitting agent, and quaternary ammonium compound. The apexes of the other triangular end represent the ternary system water, splitting agent, and sodium or potassium salt. It should be noted that the ternary diagram in FIG. 1 represents a slice out of the triangular prism at a point where the quaternary ammonium compound and the sodium or potassium salt are equimolar. In the triangular prism diagram, the region of two liquid layers will take the approximate form of a hemi-ellipsoid with the base of said hemi-ellipsoid forming part of the ternary triangular phase diagram water, splitting agent, and quaternary ammonium compound. Alternatively, the system may be represented by a number of other three-dimensional diagrams. Examples include a regular tetrahedron, a pyramid, or a simple graphical method using three axes. Graphical methods of this type are described in "The Phase Rule and Its Applications," by A. N. Campbell and N. O. Smith, 9th ed., Dover Publications, Inc., 1780 Broadway 19, N.Y. Unfortunately, most of the methods available are difficult to depict effectively and in a useful way on a planar diagram. Consequently, no attempt is made to do so here. However, it is to be understood that the present invention contemplates systems wherein non-stoichiometric ratios of QX and MY are used. It is further understood that satisfactory three-dimensional diagrams can be readily constructed in the same manner as described for the construction of FIG. 1.

It will be noted that FIG. 1 is a triangular graphical representation illustrative of a four-component system, namely, water, a splitting agent, and a mixture of a quaternary ammonium salt with a sodium or potassium salt. FIG. 2 is a graphical representation illustrative of a three-component system, namely, water, a quaternary ammonium salt, and a splitting agent.

Referring to FIG. 2, the vertexes A', B', and C' of the large triangle represent 100 percent tetraethylammonium borohydride, 100 percent sodium hydroxide, and 100 percent water respectively, each by weight. Any selected point P' on the side A'B' of the triangle represents the amounts of tetraethylammonium borohydride and sodium hydroxide in percent by weight in a solid impure tetraethylammonium borohydride.

The diagram within the triangle A', B', and C' in FIG. 2 was established empirically by extracting impure borohydrides having varying amounts of sodium hydroxide and tetraethylammonium borohydride with varying amounts of water at 25° C. The area bounded by the straight lines A'F, A'D', and the curved line D'EF represents aqueous liquor compositions of tetraethylammonium borohydride, sodium hydroxide, and water which fall within the scope of the invention, that is, when the solution is permitted to settle at a temperature of 25° C., it separates in two separate layers, the upper layer being essentially a saturated aqueous solution of the quaternary ammonium borohydride and a small amount of the alkali metal hydroxide and the lower layer being an aqueous solution of the alkali metal hydroxide containing a small amount of borohydride. The remaining areas within the large triangle A'B'C' represent liquor compositions obtained by extraction at 25° C. which fall outside the scope of the invention, that is, when the solutions are permitted to settle only a single liquid layer is formed. The line C'J, drawn from the vertex C' through the point F, intersects the line A'B' at the point J. The point J represents a solid impure tetraethylammonium borohydride containing about 5 percent by weight of the borohydride and indicates that, when extracting impure tetraethylammonium borohydride at 25° C., the method of the invention is not operative if the solid impure borohydride contains less than about 5 percent by weight of borohydride.

The area within the triangle A'D'F represents aqueous liquid compositions formed by extracting impure solid tetraethylammonium borohydrides at 25° C. with sufficient water to dissolve substantially all the sodium hydroxide but not all the borohydride, the solid residues being substantially pure tetraethylammonium borohydride. If the solution is removed from the solid residue and permitted to settle, two separate liquid layers are formed.

The area bounded by the straight line D'F and the curved line DEF represents aqueous liquid compositions formed by extracting solid impure borohydride at 25° C. with sufficient water to dissolve all the borohydride as well as all the sodium hydroxide to form a liquor which, when permitted to settle, separates in two separate layers.

It will be apparent from the above that any impure tetraethylammonium borohydride represented by a point P on the line A'B' in FIG. 2 may be treated by the method of the invention if a line drawn from the point P to the vertex C' of the triangle A'B'C' passes through the area bounded by the straight lines A'F, A'D', and the curved line D'EF. The line PC' in FIG. 2 intersects the line A'F at the point K and intersects the curved line D'EF at the point L. Any point on the portion KL of the line PC' represents the amounts in percent by weight of tetraethylammonium borohydride, sodium hydroxide, and water in a liquor composition which, when permitted to settle at a temperature of 25° C., separates in two separate liquid layers.

In a manner similar to that described in connection with FIG. 2, a triangular graphical representation may be established empirically at any desired temperature for any system of water, any splitting agent, and any quaternary ammonium salt the cation of which contains from 5 to 15 carbon atoms. Thus for example, the vertex A' in FIG. 2 may represent 100 percent tetraethylammonium sulfate and the vertex B' may represent 100 percent of another splitting agent, such as sodium sulfate, the vertex C' representing 100 percent water.

The invention also makes possible the purification of quaternary ammonium compounds which contain as impurities salts other than those designated as splitting agents. For example, sodium metaborate can be separated from a quaternary ammonium borohydride by adding a suitable amount of one of the splitting agents to the impure borohydride and then extracting the mixture with water. In such case, when the liquor is permitted to settle, the metaborate will be found in the aqueous solution of the splitting agent.

When a sodium or potassium salt is reacted in water with a quaternary ammonium salt the anion of which is an anion of one of the splitting agents to form an aqueous solution of a splitting agent and a quaternary ammonium salt, an empirically established diagram of the type illustrated in FIG. 2 may be used to determine the amount of water which should be present in the reaction liquor to cause it, when permitted to settle, to separate in two separate aqueous solutions one of which is essentially an aqueous solution of the splitting agent and the other is essentially an aqueous solution of the formed quaternary ammonium salt.

We claim:

1. In a method for purifying a quaternary ammonium compound containing as an impurity a salt selected from the group consisting of sodium hydroxide, potassium hydroxide, potassium fluoride, potassium carbonate, potassium citrate, potassium tartrate, sodium carbonate, potassium sulfate, and sodium sulfate, said quaternary ammonium compound being selected from the group consisting of a tetraethylammonium compound, a tetrapropylammonium compound, and a benzyltrimethylammonium compound, said quaternary ammonium compound containing substantial amounts of said impurity and quaternary ammonium compound, the step comprising extracting the solid impure quaternary ammonium compound with an amount of water to form two immiscible layers, one of which consists essentially of an aqueous solution of the selected quaternary ammonium compound and the other consists essentially of an aqueous solution of the selected impurity.

2. In a method for purifying a quaternary ammonium compound containing a water soluble impurity, said quaternary ammonium compound being selected from the group consisting of a tetraethylammonium compound, a tetrapropylammonium compound, and a benzyltrimethylammonium compound, the step comprising mixing with the impure quaternary ammonium compound an amount of water and an amount of an inert salt selected from the group consisting of sodium hydroxide, potassium hydroxide, potassium fluoride, potassium carbonate, potassium citrate, potassium tartrate, sodium carbonate, potassium sulfate, and sodium sulfate to form an aqueous liquor having two immiscible liquid layers, one of which consists essentially of an aqueous solution of the selected quaternary ammonium compound and the other consists essentially of an aqueous solution of said salt and said impurity.

3. The method which comprises reacting in an aqueous medium a first salt selected from the group consisting of sodium and potassium salts with a first quaternary ammonium compound selected from the group consisting of a tetraethylammonium compound, a tetrapropylammonium compound, and a benzyltrimethylammonium compound and the anion of which is selected from the group consisting of hydroxyl, fluoride, carbonate, sulfate, citrate, and tartrate to form an aqueous reaction liquor consisting essentially of a second quaternary ammonium compound and a second salt selected from the group consisting of sodium hydroxide, potassium hydroxide, potassium fluoride, potassium carbonate, potassium citrate, potassium tartrate, sodium carbonate, potassium sulfate, and sodium sulfate, the anion of said first selected salt having a stronger affinity for the quaternary amonium cation than the anion of said first quaternary ammonium compound, adjusting the amount of water and the amount of said second salt in said liquor to form two immiscible layers one of which consists essentially of an aqueous solution of said second quaternary ammonium compound and the other consists essentially of an aqueous solution of said second selected salt.

4. In a method for reacting in an aqueous medium a salt selected from the group consisting of sodium and potassium salts with a quaternary ammonium compound selected from the group consisting of a tetraethylammonium compound, a tetrapropylammonium compound, and a benzyltrimethylammonium compound, the step which comprises adjusting the amount of water in said aqueous medium and dissolving in the latter an amount of a compound which is inert under the conditions of the reaction and which is selected from the group consisting of sodium hydroxide, potassium hydroxide, potassium fluoride, potassium carbonate, potassium citrate, potassium tartrate, sodium carbonate, potassium sulfate, and sodium sulfate such as to form two immiscible layers, one of which is essentially an aqueous solution of a quaternary ammonium compound and the other of which is essentially an aqueous solution of said inert compound and a salt selected from the group consisting of sodium and potassium salts.

5. The method as claimed by claim 4 wherein a first solution is formed by dissolving the amounts of said selected compound and said selected salt in a portion of the total amount of water, a second solution is formed by dissolving said quaternary ammonium compound in the remainder of said total amount of water, causing said first solution and said second solution to flow countercurrent to one another in a given path, thereby causing the selected quaternary ammonium compound and the selected salt to react progressively whereby said first solution substantially free of said selected salt and containing one reaction product and substantially all of said selected compound in solution therein is removed from one end of said path and said second solution substantially free of the selected quaternary ammonium compound and containing the other reaction product in solution therein is removed from the opposite end of said path.

6. The method as claimed by claim 4 wherein the anion of the selected salt has a greater affinity for the quaternary ammonium cation than the anion of the quaternary ammonium compound.

7. As a composition of matter the aqueous liquor referred to in claim 1 having two immiscible layers, one of which is essentially an aqueous solution of the quaternary ammonium compound and the other is essentially an aqueous solution of the selected impurity.

8. As a composition of matter the aqueous liquor referred to in claim 4 having two immiscible layers, one of which is essentially an aqueous solution of a quaternary ammonium compound and the other of which is essentially an aqueous solution of said inert compound and a salt selected from the group consisting of sodium and potassium salts.

References Cited by the Examiner

Banus et al.: J.A.C.S., vol. 74, pp. 2346–2348 (1952).
Wheeler et al.: J.A.C.S., vol. 77, pp. 2024–2025 (1955).

CHARLES B. PARKER, *Primary Examiner.*